3,340,202
SINTERED POLLUCITE RADIOACTIVE SOURCE AND METHOD OF PRODUCTION

Andre Olombel, Chatillon-sous-Bagneux, Cecile Perebaskine, Jouy-en-Josas, and Andre Raggenbass, Wissous, France, assignors to Commissariat à l'Energie Atomique, Paris, France, organized under the laws of France
No Drawing. Filed June 17, 1966, Ser. No. 558,282
Claims priority, application France, June 23, 1965, 21,959, 21,960
7 Claims. (Cl. 252—301.1)

The present invention has for its object a method of preparation of sintered pollucite which is primarily intended for the production of radioactive sources.

Pollucite is a silico-aluminate of caesium which crystallizes in the cubic system and has the composition $Ca_2O, Al_2O_3, 4 Si_2, H_2O$.

It is known that this mineral can be obtained synthetically:

Either by hydrothermal process which consists in heating in an autoclave between 160° and 400° C. a mixture of a colloidal solution of silica, aluminum hydroxide obtained by hydrolysis of the aluminum amalgam and caesium hydroxide which is formed by the action of caesium sulphate on barium hydroxide or by dry process which consists in converting the $\alpha$ spodumene into $\beta$ spodumene by heating to 1100° C.

$$\alpha \, (LiNa) \, Al \, Si_2O_6 \rightarrow \beta \, (LiNa) \, Al \, Si_2O_6$$

and heating to approximately 950° C. a mixture of crushed $\beta$ spodumene (particle size of the order of 150 mesh) with caesium sulphate and finally washing with water in order to eliminate the soluble salts.

However, these processes result in the formation of a crystalline pollucite which cannot readily be sintered, besides being relatively long and complex.

This invention is directed to a method for the simple and economic preparation of an amorphous powder which readily permits of shaping and sintering in the state of crystalline pollucite.

The method in accordance with the invention is essentially characterized in that it comprises the successive steps of forming a mixture of colloidal solution of silica and solutions of salts of caesium and of aluminum in stoichiometric quantities, of evaporating to dryness while stirring said mixture, of heating to a temperature below 1000° C., of compacting and sintering at a temperature of the order of 1600° C.

In order to form the starting mixture, use is preferably made of the nitrates of caesium and aluminum by reason of their relatively low decomposition point. These salts are added in stoichiometric quantities to a colloidal solution of silica, whereupon the aggregate is evaporated to dryness while stirring at a temperature of the order of 100° C.

It is recommended practice to perform the evaporation while stirring in order to retain constant homogeneity of the mixture.

The nitrates begin to decompose from 250° C. The heating program of this stage must be fairly slow, namely of the order of 100 to 150° C./h.

The amorphous powder which is obtained after heat treatment is subsequently re-ground, then shaped into pellets by simple compacting under relatively high pressures, for example of the order of 2,500 bars. The use of high pressures makes it possible to reduce subsequent shrinkage during the sintering process. After compacting, the pollucite is sintered, preferably in vacuo, at a temperature of the order of 1600° C.

There is finally obtained a product having a density of the order of 3.30 grams per cm.³.

In accordance with an alternative form of embodiment of the invention, the product obtained after evaporation to dryness is subjected to prolonged calcination at a temperature below 600° C. and ground to a well-defined particle size. The powder which is obtained is activated by water vapor, shaped by compacting and sintered in accordance with a heating program comprising two level-temperature stages located respectively in the vicinity of 970° C. and 1200° C.

The calcining of the powder must be carried out at a temperature which is preferably within the range 520° C. to 540° C. until complete decomposition of the caesium nitrate has taken place. The duration of the calcining process depends on the particle size of the powder and the thickness of the layer which is obtained after evaporation to dryness. The calcining time is 40 hours in the case of a powder having a mean particle diameter of 0.05 mm. and in the case of a layer having a thickness of 6 mm., and 90 hours in the case of a powder having a mean particle diameter of 1 mm. and in the case of a layer 10 mm. in thickness.

The amorphous product which is obtained after heat treatment is ground to a mean particle size of 10$\mu$. The grinding operation is preferably carried out in ether, inasmuch as this is conducive to a good particle size distribution and prevents the formation of a powder mist.

In accordance with one important feature of this alternative embodiment of the invention, the powder is activated after evaporation of the ether or, in other words, is made essentially suitable for the purpose of undergoing shaping and sintering operations. The activation referred-to consists in placing the powder which has been previously heated to a temperature in the vicinity of 200° C. in an atmosphere which is saturated with water vapor at 100° C. for a period of one quarter of an hour to one half hour. This operation endows the powder with remarkable plasticity and substantially increased sinterability.

The amorphous powder which is obtained after activation is shaped into pellets by simple compacting under a pressure of the order of 2 tonnes per cm.².

After compacting, the pellets are sintered in accordance with a heating program comprising two level-temperature stages, one stage being located at a temperature of approximately 970° C. and the other stage being located at a temperature of approximately 1200° C. The times of heating at these temperatures depend on the geometry of the compacted products, and are respectively 2 hours and 5 hours in the case of a compact 6 mm. in diameter and 4 mm. in height. Said heating times last 2 hours and 7 hours in the case of a compact having a diameter of 30 mm. and a height of 15 mm. The rate of heating is in the vicinty of 150° C. per hour.

The method in accordance with the invention makes it possible to prepare a crystalline and sintered product which is similar to pollucite and which has a high density, without any appreciable loss of caesium.

The crystalline product which is prepared by sintering in accordance with the method hereinabove described can be employed especially for the purpose of fabricating ceramic radioactive sources of caesium-137.

A radioactive source having a base of sintered pollucite has a large number of advantages over the sources employed in the prior art. Totally insoluble sintered pollucite combines high mechanical strength with high heat resistance.

The ceramic radioactive source which is prepared as hereinabove described is advantageously employed as a heat source in an electric power generator which makes use of a system of direct conversion of heat into electricity. By virtue of the small dimensions which are made possible, a generator of this type can profitably be utilized in space vehicles.

What we claim is:

1. A method of preparation of sintered pollucite comprising the successive steps of mixing a colloidal solution of silica and solutions of nitrates of caesium and of aluminum in stoichiometric quantities, then evaporating the resulting mixture to dryness with stirring of said mixture, then heating said mixture to a temperature below 1000° C. and then compacting and sintering said mixture at a temperature of about 1600° C.

2. A method as described in claim 1, said mixture after drying being then calcined at a temperature below 600° C., then grinding the calcined product to a predetermined particle size, then activating the resulting powder by contact with water vapor, then shaping said activated powder by compacting and then sintering the shaped powder by heating at two level-temperature stages respectively at about 970° C. and 1200° C.

3. A method as described in claim 1, said compacting step being carried out at a pressure of about 2500 bars.

4. A method as described in claim 2, said calcining step being at a temperature from about 520° C. to 540° C.

5. A method as described in claim 2, the calcined product being ground to a mean particle size of $10\mu$.

6. A method as described in claim 2, said step of activating the powder being performed in an atmosphere of water vapor at a temperature in the vicinity of 100° C. for a period of from 15 to 30 minutes.

7. A radioactive source containing ceasium-137 comprising sintered pollucite prepared by the method of claim 1.

References Cited
UNITED STATES PATENTS

| | | | |
|---|---|---|---|
| 2,835,699 | 5/1958 | Fries | 252—301.1 |
| 3,114,716 | 12/1963 | Quinby | 252—301.1 |

BENJAMIN R. PADGETT, *Primary Examiner.*

CARL D. QUARFORTH, *Examiner.*

S. J. LECHERT, Jr., *Assistant Examiner.*